United States Patent [19]

Takeuchi et al.

[11] Patent Number: 4,827,905
[45] Date of Patent: May 9, 1989

[54] OUTER GLASS PIPES FOR SOLAR HEAT COLLECTOR PIPES

[75] Inventors: Hirosato Takeuchi; Toshio Mikiya, both of Tokyo, Japan

[73] Assignee: Nitto Kohki Co., Ltd., Tokyo, Japan

[21] Appl. No.: 363,446

[22] Filed: Mar. 30, 1982

[30] Foreign Application Priority Data

May 18, 1981 [JP] Japan .................. 58-74628

[51] Int. Cl.[4] .................................. F24J 3/02
[52] U.S. Cl. ...................... 126/443; 65/DIG. 9; 138/109
[58] Field of Search ............... 126/442, 443; 138/112, 138/103, 109; 65/DIG. 9

[56] References Cited

U.S. PATENT DOCUMENTS

| | | | |
|---|---|---|---|
| 3,253,611 | 5/1966 | Cummins | 251/337 X |
| 3,361,154 | 1/1968 | Alexandre | 251/337 X |
| 3,882,901 | 5/1975 | Seiler et al. | 138/109 |
| 4,080,954 | 3/1978 | de Wilde et al. | 126/443 |
| 4,120,285 | 10/1978 | Nugent | 126/443 |
| 4,126,121 | 11/1978 | Fairbanks . | |
| 4,134,388 | 1/1979 | Kirsten et al. | 126/448 X |
| 4,183,351 | 1/1980 | Hinotani et al. | 126/443 |
| 4,186,725 | 2/1980 | Schwartz | 126/443 |
| 4,231,353 | 11/1980 | Kanatani et al. | 126/442 X |
| 4,292,464 | 9/1981 | Vogt et al. | 65/59.6 X |
| 4,353,354 | 10/1982 | Scoarnec et al. | 126/443 |
| 4,364,373 | 12/1982 | Takeuchi et al. | 126/443 X |
| 4,409,964 | 10/1983 | Shimada et al. | 126/443 |
| 4,413,616 | 11/1983 | Tonomura et al. | 126/443 |

FOREIGN PATENT DOCUMENTS

| | | | |
|---|---|---|---|
| 2444237 | 8/1980 | France | 126/443 |
| 10651 | 2/1981 | Japan | 126/443 |

Primary Examiner—Samuel Scott
Assistant Examiner—Carl D. Price
Attorney, Agent, or Firm—Birch, Stewart, Kolasch & Birch

[57] ABSTRACT

An outer glass pipe for a solar heat collector pipe includes an outer glass pipe body formed of a straight glass pipe being open at both ends and a lid member provided therein with a small diameter opening. An exhaust pipe of a small diameter is attached to the lid member to form a bottom member. The bottom member is air-tightly fixed to one open end of the outer glass pipe body on its peripheral edge to close one of the open ends.

1 Claim, 4 Drawing Sheets

FIG. 6
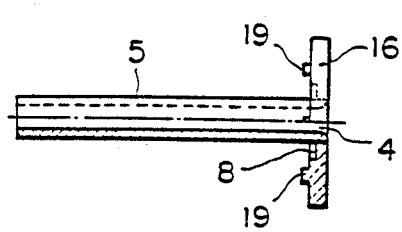
FIG. 7
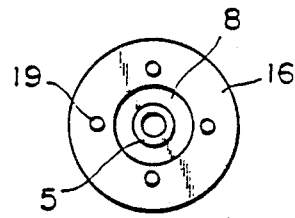
FIG. 8
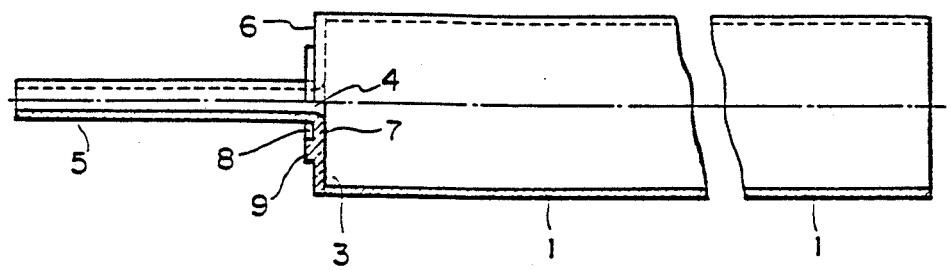
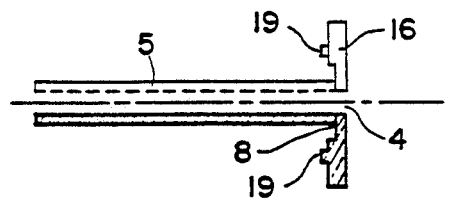
FIG. 9

OUTER GLASS PIPES FOR SOLAR HEAT COLLECTOR PIPES

BACKGROUND OF THE INVENTION

The present invention relates to improvements in the outer glass pipes for use with solar heat collector pipes.

Solar heat collector pipes of the type which are designed to protect the outer surface of heat receptor pipes with closed type straight glass pipes are now widely used for solar heat collector equipment. For example, the solar heat collector pipes of vacuum double structure or vacuum single structure have been proposed in the art. The former type collector typically comprises an inner pipe of smaller diameter, having one end closed by rounding and the other end left open, and an outer pipe of larger diameter, having one end closed by rounding and the other end left open, said outer pipe having said inner pipe inserted concentrically therethrough. A space between the outer and inner pipes is then maintained in an air-tight condition under reduced pressure. The latter type collector typically comprises a straight glass pipe having one end closed by rounding, in which a heat medium-filled tube is placed, such as various tubes inclusive of a U-shaped or hair pin tube. A space between the outer pipe and the tube is similarly maintained in an air-tight condition under reduced pressure. In either case, an exhaust glass pipe of a smaller diameter is attached to the closed end of the outer pipe so as to facilitate an air-tight sealing of said space. However, mounting such an exhaust pipe requires, in addition to rounding and other ordinary glass works, drawing, boring which has to be performed by skilled workmen, welding, etc., leading to a considerable rise of the price of product. This is because a series of exhaust pipes are provided in the rounding step involved in the production of outer glass pipes, or separate exhaust pipes are attached to the bottoms of a series of rounded outer pipes as by welding. Additionally, if mishandling occurs in the step of mounting the exhaust pipes on the outer pipes, then the outer pipes should entirely be disposed of, resulting in grave economical losses.

Thus, the prior art glass pipes for solar heat collector pipes of vacuum single or double struction leave much to be desired in view of production and economy inclusive of production cost. Furthermore, the least of mishandling is not permitted in the prior art production system for the foregoing reasons.

SUMMARY OF THE INVENTION

A main object of the present invention is therefore to provide a novel outer glass pipe designed for use with solar heat collector equipment, which is both easy and inexpensive to manufacture, and makes great contribution to a lowering of the cost.

According to the present invention, this object is accomplished by the provision of an outer glass pipe for a solar heat collector pipe, comprising an outer glass pipe body formed of a straight glass pipe being open at both ends and a lid member provided therein with a small exhaust opening, to which an exhaust pipe of a smaller diameter is attached to form a bottom member. The bottom member being air-tightly fixed to one open end of said outer glass pipe body on its peripheral edge, thereby closing said one open end.

Thus, the inventive outer glass pipe can be manufactured only by air-tightly fixing to an open end of a straight pipe a lid member which is easily fabricated with no special skill.

BRIEF DESCRIPTION OF THE DRAWINGS

This and other objects and features of the present invention will become apparent from a reading of the following explanation with reference to the accompanying drawings, in which:

FIG. 6 is a quartered side view of an alternative lid member, FIG. 7 is a front view of the bottom member, and FIG. 8 is a view similar to FIG. 4, which shows that the bottom member may be applied over the open end, and FIG. 9 is a quartered side view of an alternative lid member.

DETAILED DESCRIPTION OF THE INVENTION

Figure 4:
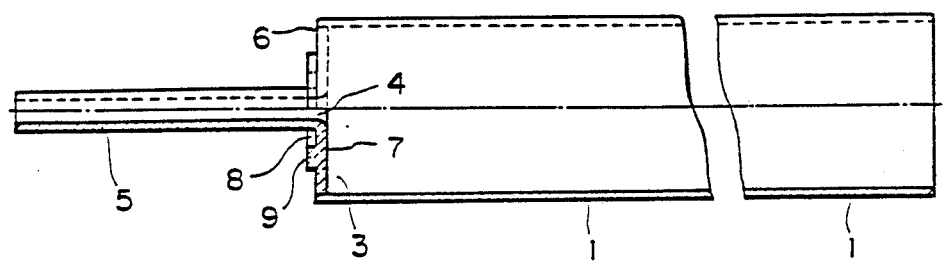
FIG. 4 is a quartered side view of the straight glass pipe and the bottom thereof prior to air-tight sealing and fixation.

As illustrated in FIG. 4, a straight glass pipe shown at 1 is used for the formation of an outer pipe, which is illustrated as open at both ends. One end 3 of the pipe 1 is closed with a circular glass lid member 2 shown in FIG. 5. The member 2 is provided in its center with a small exhaust opening 4, to which an exhaust glass pipe 5 of smaller diameter is welded to form a bottom member 6. The bottom member 6 is welded on its peripheral edge into the one open end 3 of the outer glass pipe 1 to form a bottom portion 7. In other embodiments, the exhaust glass pipe 5 may be designed to have an outer diameter equal to the diameter of the exhaust opening 4. Alternatively, as illustrated in FIG. 9, the exhaust glass pipe 5 may have an inner diameter equal to the diameter of the exhaust opening 4. In all embodiments, the exhaust glass pipe 5 is welded to the exhaust opening 4 to form a bottom member 6 for closing off the open end 3 of the outer glass pipe 1.

Figure 5:
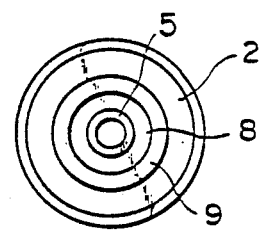
FIG. 5 is a front view of the lid member.

As shown in FIGS. 4 and 5, the circular glass lid member 2 forming a main part of said bottom member 7 has one surface, i.e., a surface facing said one end of the pipe 1, which is flattened. As shown in FIG. 5, the opposite surface of member 2 is provided with an annular groove 8 of a given width, which is positioned concentrically with respect to the central opening 4, and with an annular rib 9 of a given width, which is positioned adjacent to and in concentrical relation to said groove 8. The exhaust pipe 5 is attached to the surface of said groove 8 and said rib 9. FIGS. 6 and 7 show an alternative bottom member 16 which is similar to the first bottom member 6 in that it has therein an annular groove 8, but is different therefrom in that a plurality of projections 19 are formed in place of the annular rib 9. Alternatively, the bottom member 6 may be welded on its peripheral edge onto the open end 3 as shown in FIG. 8.

Reference numeral 11 stands for an inner glass pipe through which a heating medium flows, and 12 a frame for solar heat collector equipment.

Figure 1:
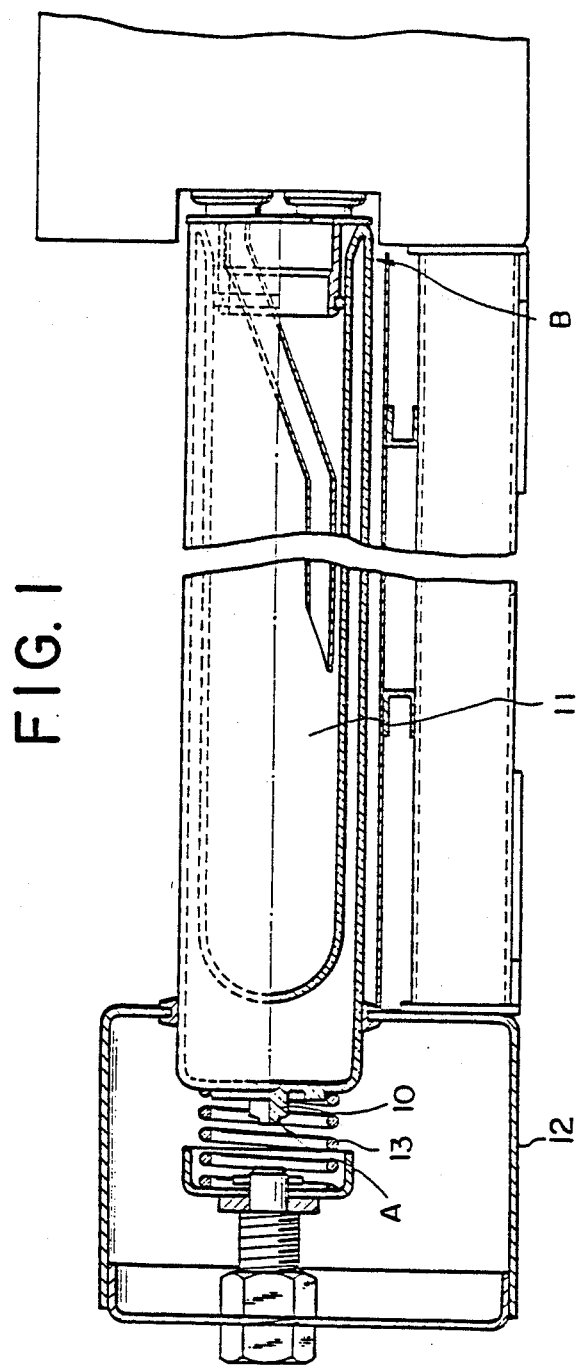
FIG. 1 is a partly cut-away side view of a solar heat collector pipe equipped with the outer pipe according to the present invention.
Figure 2:
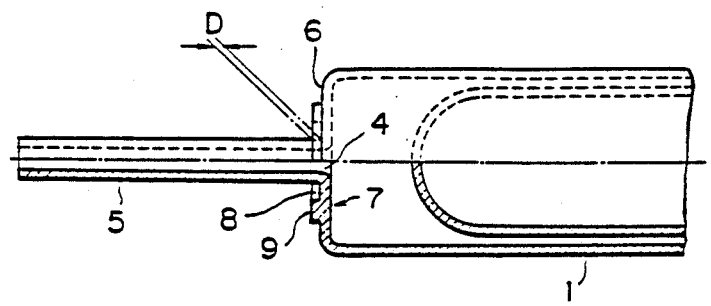
FIG. 2 is a quartered side view of a part of the bottom of a solar heat collector equipped with the outer pipe according to the present invention, which is prior to sealing under reduced pressure.
Figure 3:
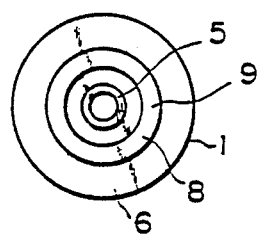
FIG. 3 is a front view of the bottom as viewed in the lefthand direction in FIG. 2.

Reference will now be made to the reasons for provision of the annular groove 8 in the surface of the lid member 2, to which is attached the exhaust pipe 5. The exhaust pipe 5 has to be chipped off by electrical fusion using a heater or the like means, after an amount of air present in between the outer pipe and the inner pipe inserted therethrough and joined thereto has been exhausted. The heat radiating from the heater is transmitted exclusively to the portion of the pipe 5 to be chipped off, and is not substantially conveyed to the lid member 2, since the heater is spaced away from the surface of member 2 by a length corresponding to a depth D of groove O. In other words, the exhaust pipe 5 can be chipped off in a very short period of time with no fear of melting the lid member 2. In addition, since the exhaust pipe 5 can be chipped off at a position (as indicated by an arrow A in FIG. 1) as close to the lid member 2 as possible, the length of a projection 10, i.e., the portion of pipe 5 which has not been chipped off, can be reduced as much as possible. Such a projection is often referred to as an outer pipe tail in the art. It is thus possible to prevent an accident which may otherwise happen due to distortion of glass which occurs when an impact force is applied, viz. a breakdown of a portion of the outer pipe which is in the vicinity of the junction of the outer and inner pipes, as indicated by an arrow B in FIG. 1.

On the other hand, the annular rib 9 or a plurality of projections 19 are provided on the glass lid member 2 for the following reasons. When a solar heat collector pipe is mounted on the frame, said rib 9 or projections 19 serve as a seat for a spring 13 for pressing the collector pipe in the axial direction, so that its bottom can be placed in a stable state.

With the arrangement according to the present invention, an accident leading to mishandling of parts will not happen during preparation of the bottom member 6 or air-tight installation thereof. In addition, the extent of damage due to mishandling, if any, will only be limited to the lid member 2 forming the bottom member or the exhaust pipe 5. Thus, it is not necessary in the present invention to dispose of the entire outer pipe.

What is claimed is:

1. An outer glass pipe for a solar heat collector pipe comprising:

an outer glass pipe body formed of a straight glass pipe being open at both ends; and a bottom member closing one open end of said outer glass pipe body, said bottom member including a flat disc-like bottom sealing glass lid member hermetically welded to said one open end of said outer glass pipe body on its peripheral edge, said lid member having a central small exhaust opening provided therethrough, and a small diameter exhaust glass pipe hermetically welded at one end to said glass lid member at said exhaust opening so as to communicate with the exhaust opening and extending concentrically with an axially outwardly from the lid member, said lid member having an annular groove in its outer surface around said exhaust opening and around said one end of the exhaust glass pipe to thereby enable the exhaust pipe to be chipped off at a location closer to the outer surface of said lid member, and a plurality of projections around said groove adapted to retain a spring for resiliently mounting said outer glass pipe on said bottom lid member to a frame of the solar heat collector.

* * * * *